Dec. 23, 1958 C. D. HEINZE 2,865,053
RETREADING TIRE CURING RIM
Filed Jan. 26, 1956

CHALMER D. HEINZE — INVENTOR.

BY

Charles W. Hull

ATTORNEY

2,865,053
RETREADING TIRE CURING RIM

Chalmer D. Heinze, Carlisle, Pa., assignor to Carlisle Corporation, a corporation of Delaware Application January 26, 1956, Serial No. 561,474

6 Claims. (Cl. 18—45)

The present improvements relate to vulcanizing apparatus for use in retreading worn or damaged pneumatic tires, and more particularly to the collapsible curing rim structure employed therewith.

That portion of the conventional vulcanizing apparatus which relates to the present invention consists of a matrix, or mold, into which the tire is placed which is to receive the retread. An air bag is customarily inserted in the tire, and then a collapsible curing rim is also inserted in the tire, and the air bag is inflated, thereby pressing itself and the inner rim against the inner walls of the tire to hold it in rigid position in the matrix or mold. The rim is circular and rigid, so that the inflated air bag serves to press the tire against the mold.

Because of the use of tires of many different sizes, the small shop or garage which solicits retreading business must stock curing rims of many different sizes. Obviously a curing rim of a small size, when inserted in a tire of twice the size, will prevent the air bag from performing its proper function, and will in time, cause the air bag to lose its efficiency and to depreciate rapidly. It is therefore obvious that a shop in the retreading business, must keep a supply of curing rims of many different sizes if it is to handle the trade resulting from many different sizes of tires.

A primary object of the invention, therefore, is to provide a single tire curing rim structure unit which will serve in retreading a plurality of sizes of tires. A further object is to provide an improved collapsible curing rim structure which is automatically adjustable to various tire sizes in response to inflation of the conventional air bag.

Another object of the improvements is to provide a unit of the aforementioned type, which has complementary annular structures having common diameters, so that the parts will be in register, with an overlapping flange structure fixed to one section and telescoping a portion of the other. A further object is to provide a device of the aforementioned character, which is yieldingly maintained in operative position by resilient means such as spring members and the like, so that the parts will always be preserved in cooperative relationship.

A further object is to provide a curing rim structure having an offset flange element for defining a recess for receiving the complementary rim structure, and of sufficient width to present a continuous surface when the rim is fully expanded.

A further object of the improvements is to provide an endless, collapsible curing rim structure unit, having self-adjusting features and having annular bead portions with convex surfaces for engaging the inner walls of the tire.

These and other objects of the improvements will appear as the description proceeds. The preferred embodiment is illustrated in the accompanying drawings in which.

Figure 3:
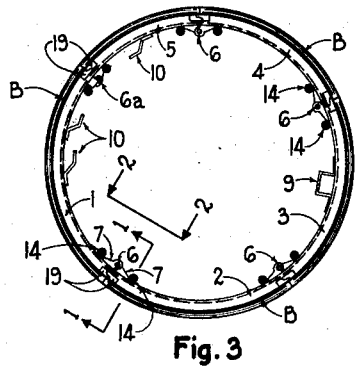
Fig. 3 is a side elevation of the entire curing rim structure unit, shown in miniature, for convenience in illustration, and shown in full circumferential or annular form.

Referring to the drawings, Fig. 3 illustrates, on a reduced scale, a side elevation of the curing rim unit of the present improvements in full circumferential or annular position as it exists when positioned within the tire to be retreaded. This unit comprises a plurality of segments 1, 2, 3, 4 and 5, movably attached in end-to-end relationship so as to define an endless ring. In the illustrated embodiment these segments are of varying linear extent.

In the preferred embodiment, these segments are hinged together by pivot pins 6 and 6a, extending through ears 7, integrally connected with the ends of adjacent segments. A suitable boss 8 surrounds each pivot pin 6 and 6a for retaining the parts in snug relationship. Pins 6 are permanently secured in place, while pin 6a is removable to facilitate assembly and collapse of the rim. Suitable handles 9 and 10 are provided for receiving a suitable tool (not shown) for manipulating the unit to and from full circular position or to and from collapsed position. As aforesaid, the segments 1 to 5 are of different linear extent, to facilitate collapsing and insertion of the unit within the tire carcass.

Figure 1:
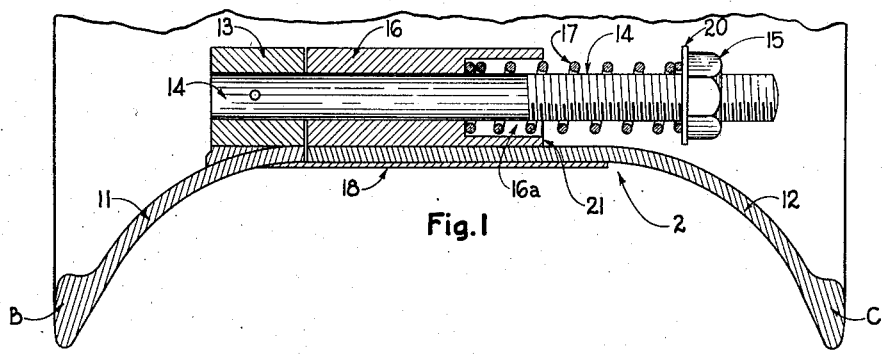
Fig. 1 is an enlarged section of the collapsible curing rim structure unit taken on line 1—1 of Fig. 3.
Figure 2:
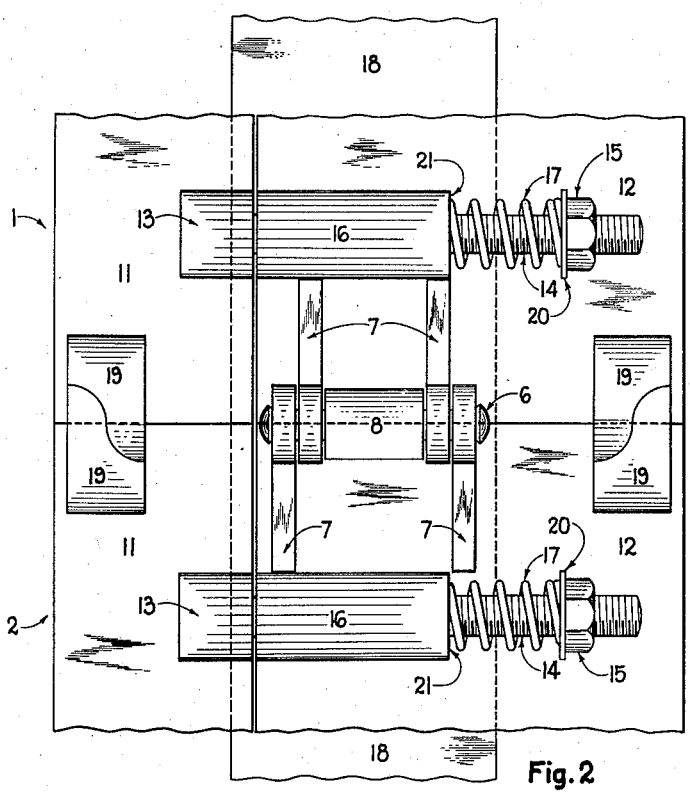
Fig. 2 is a fragmentary plan view of the segments at their end-to-end juncture, looking in the direction of the arrows indicated at line 2—2 of Fig. 3, parts being broken away to show the overlapping flange.

Conventional curing rims have the general transverse contour of the rim illustrated in Fig. 1, extending from bead B in an arc to bead C. These conventional rims consist of a plurality of segments attached in a manner to define a ring. In the present improvements, however, these segments are split longitudinally or circumferentially of the ring unit, to define a subsegment 11 and subsegment 12, which, as seen in Fig. 1, are in register, are complementary to one another, and also define complementary annular collapsible rim structures.

While the provision of pins 6, 6a, ears 7 and bosses 8, serve to retain the segments in end-to-end relationship, means are also provided for yieldingly maintaining subsegments 11 and 12 of each segment in complementary registering position. This means consists in a self-adjusting or yielding structure clearly illustrated in Fig. 1. In that view, sub-segment 11 is provided with a bolt anchor 13 welded or otherwise secured thereto with a rigid threaded bolt 14 pinned thereto and projecting over a substantial portion of sub-segment 12 where it has a nut 15 in threaded engagement therewith. A sleeve 16 is welded or otherwise fixed to sub-segment 12 and provides a free housing within which bolt 14 may reciprocate. A coil spring 17 surrounds a portion of bolt 14 and has its ends engaging washer 20 in front of nut 15 and sleeve 16.

It is apparent from the foregoing description that when parts 11 and 12 are spread or expanded, the springs 17 will be placed under compression so that upon release of pressure, the springs will restore the parts to the position shown in Fig. 1. This yieldable bolt and spring device, permits spreading of the parts 11 and 12 to any desired degree to accommodate different tire sizes.

Means for limiting the spread of the segments 11 and 12 may be provided in various forms. The preferred form illustrated in Fig. 1 consists in providing recesses in each housing such as recess 16a. One end of the spring 17 is nested therein, while the outer end engages washer 20 on bolt 14 and retained by nut 15. The diameter of the washer 20 is substantially the width of the housing 16. Accordingly, during the movement of the segments 11 and 12 to a "spread" position, the spring 17 is compressed until washer 20 meets end 21 of housing 16.

This engagement arrests further spreading of the segments.

It is apparent that the nut 15 may be set at any one of various positions along the bolt 14. In this manner, the degree of expansion of the segments, by the air bag, may be controlled. If desired, a lock-nut (not shown) may also be threaded onto the bolt.

It is understood that the structure illustrated in Fig. 1 is provided at ten locations about the circumference at the unit shown in Fig. 3.

In order that the innermost surfaces of the rim unit may present a relatively smooth inner surface, irrespective of the degree of expansion or spreading of parts 11 or 12, the present improvements include a flange member 18 welded or otherwise firmly secured to part 11 but offset with respect to part 12, so as to define a recess between it and the sleeve 16. If desired however, the segments may be designed to omit the recess. In such a form segment 11 and flange 18 may be formed as an integral unit. Thereupon both segments 11 and 12 may be made of thinner gauge metal, thereby reducing the recess to a negligible offset. This flange 18 overlaps or telescopes the part 12, as clearly seen in Fig. 1, and is of the same linear extent as each segment to which it is attached, so that it also presents a complete annulus or ring along with the five segments previously referred to.

This flange element serves to cover or seal the gap or space between the parts 11 and 12, when they are spread transversely, and protects the air bag (not shown) from injury or impairment during inflation or deflation of the bag.

Complementary studs 19, integral with the segments, are provided for alignment purposes. A suitable aperture, not shown, is provided through some portion of the rim unit to accommodate the valve stem of the air bag.

The use of the improved collapsible curing rim unit of the present improvements will be obvious to those skilled in the art. Charts are provided which tabulate the various tire sizes, the plys, etc., and such charts indicate the exact inner wall diameter of the tire to be recapped. For any given tire size therefore, the nuts 15 on all ten of the adjustable bolts 14, are initially set to limit the expansion of the segments to a predetermined degree. Accordingly, when that degree of expansion is reached, the beads B and C will lightly engage the inner wall of the tire to insure an intimate contact, but no pressure of the metallic beads or edges of the curing rim will be pressed into the tire to impair or mar its interior.

After the tire to be retreaded is placed in the mold, the air bag is thereupon inserted in the tire and then the rim unit of the present improvements is collapsed and inserted in the tire and then expanded to full circumferential or annular position. When this condition is achieved, the air bag is then inflated, and air pressure is supplied to a degree in which the air bag expands firmly against the tire, as well as against the inner annular surface of the curing rim. Increased air pressure will force the air bag against the parts 11 and 12, and will tend to expand and separate them until a close and complete contact is arrived at between beads B and C, and the inner walls of the tire. This contact serves to support the side walls of the tire within the mold. All coil springs on all the segments are therefore under compression. When this position is reached, the retreading process may continue.

During this operation, it is apparent that the beads B and C, which have convex faces, effect a streamlined engagement with the concave inner tire walls, thereby supporting them and insuring against any impairment of the tire. This convex surface of the beads, also insures against any pinching of the air bag or the production of any unnecessary welts in the air bag due to insufficient or improper contact between the curing rim and the tire wall. The self-adjusting and expandable features of this curing rim also contribute to the same advantages above outlined with respect to protecting the life of the air bag. If desired the beads B and C may be omitted.

It is apparent, therefore, that after the nuts 15 and washers 20 are set, this curing rim unit under the expanding influence of the inflated air bag, will accommodate itself to any predetermined size of tire into which it is inserted. This expansion of the rim serves to force the beads B and C against the inner walls of the tire, and in turn, hold the tire against the inner walls of the mold or matrix, so as to insure proper positioning during the retreading operations.

Obviously, upon deflation of the air bag, the pressure on the segments is reduced and the coil springs restore segments 11 and 12 to the normal position of engagement, as seen in Fig. 1. In this position, the curing rim may be collapsed and removed from the tire. It may thereafter be used in retreading operations for another sized tire by simply re-setting nuts 15 and washers 20.

It is therefore apparent that regardless of the tize of the tire to be retreaded, the expandable curing rim of the present improvements determines the extent to which the rim will be separated by the pressure of the air bag. Accordingly, this single rim structure, supplies the need of a plurality of sizes of curing rims for a plurality of sizes of tires.

What I claim as my invention is:

1. In an apparatus for retreading automobile tires, a tire curing rim unit comprising complementary annular collapsible rim structures, each structure comprising a plurality of pivoted segments mounted for pivotal movement on pivot pins, resilient means for maintaining said structures in complementary relationship, and a segmental annular flange structure permanently fixed to one of said annular structures, and partially telescoping the other annular structure.

2. In an apparatus for retreading automobile tires, a tire curing rim unit comprising complementary annular collapsible rim structures, at least one anchor bolt and coil spring unit for yieldingly holding said structures in contacting complementary relationship for affording insertion within a tire, each structure comprising a plurality of pivoted segments mounted for pivotal movement on pivot pins, and a segmental annular flange structure integral with one of said annular structures and partially telescoping the other annular structure.

3. In an apparatus for retreading automobile tires, a tire curing rim unit comprising complementary annular collapsible rim structures, said structures having identical diameters when extending whereby they register to define a common and uniform circumference, resilient means for yieldingly holding said structures in register and in complementary relationship for affording insertion within a tire, each structure comprising a plurality of pivoted segments mounted for pivotal movement on pivot pins, and a segmental annular flange structure integral with one of said annular structures, said flange structure extending laterally from said rim structure and offset with respect thereto for partially lapping the companion rim structure.

4. In an apparatus for retreading automobile tires, a tire curing rim unit comprising complementary annular collapsible rim structures, said structures having substantially identical diameters whereby they register to define a common and uniform circumference when extended, an anchor bolt and coil spring unit for yieldingly holding said structures in register and in complementary relationship for affording insertion within a tire, each structure comprising a plurality of pivoted segments mounted for pivotal movement on pivot pins, a segmental annular flange structure integral with one of said annular structures, said flange structure extending laterally from said rim structure and partially lapping the companion rim structure, and adjustable means associated with said spring unit for restricting the lateral movement of said rim structures varying distances for fitting within tires of various sizes.

5. In a tire curing rim structure, a pair of elongated curved segments having contiguous longitudinal edges in substantial register, one of said segments having a flange portion partially overlapping the other segment, yieldable means for maintaining said segments in contiguous relationship and adjustable limiting means for predetermining the separation of said segments.

6. In an apparatus for retreading automobile tires, a tire curing rim unit comprising complementary annular collapsible rim structures, said structures having substantially identical diameters whereby they register to define a common and uniform circumference, a sleeve member having a recessed end portion anchored on one rim structure, a bolt member anchored on the said other rim structure and projecting through said sleeve, an adjustable member mounted on said bolt, a coil spring surrounding said bolt and engaging said adjustable member and said sleeve within the recessed end portion thereof tending to retain said structures together and having its compression varied according to the position of said member on said bolt, each structure comprising a plurality of pivoted segments mounted for pivotal movement on pivot pins, and a segmental annular flange structure integral with one of said annular structures, said flange structure extending laterally from said rim structure for partially lapping the companion rim structure.

References Cited in the file of this patent

UNITED STATES PATENTS

| | | |
|---|---|---|
| 653,140 | Hart | July 3, 1900 |
| 1,215,828 | McLeod | Feb. 13, 1917 |
| 2,088,130 | Broering et al. | July 27, 1937 |
| 2,115,349 | Taylor | Apr. 29, 1938 |
| 2,561,573 | Hovlid et al. | July 24, 1951 |
| 2,593,137 | Glynn | Apr. 15, 1952 |

FOREIGN PATENTS

| | | |
|---|---|---|
| 8124/27 | Australia | Apr. 5, 1928 |